(12) United States Patent
Guo et al.

(10) Patent No.: US 6,564,061 B1
(45) Date of Patent: May 13, 2003

(54) CLASS BASED BANDWIDTH SCHEDULING FOR CDMA AIR INTERFACES

(75) Inventors: Yile Guo, Woburn, MA (US); Hermant Chaskar, Woburn, MA (US)

(73) Assignee: Nokia Mobile Phones Ltd., Espoo (FI)

( * ) Notice: Subject to any disclaimer, the term of this patent is extended or adjusted under 35 U.S.C. 154(b) by 377 days.

(21) Appl. No.: 09/654,449

(22) Filed: Sep. 1, 2000

(51) Int. Cl.[7] ................................................. H04Q 7/20
(52) U.S. Cl. ....................................... 455/452; 455/453
(58) Field of Search ................................ 455/450, 451, 455/452, 453, 67.3; 370/342

(56) References Cited

U.S. PATENT DOCUMENTS 5,313,454 A  *  5/1994  Bustini et al. ............... 370/231

FOREIGN PATENT DOCUMENTS

| WO | 09312649    | 12/1997 |
| WO | WO 9814020  | 4/1998  |
| WO | WO 0016580  | 3/2000  |
| WO | 0 986 282 A1| 3/2000  |

* cited by examiner

Primary Examiner—Nguyen T. Vo
(74) Attorney, Agent, or Firm—Brian T. Rivers

(57) ABSTRACT

A method and apparatus for class based bandwidth scheduling for Quality of Service (QoS) for radio air interfaces. In an embodiment, users of an air interface are assigned to at least one of a plurality of QoS classes. Each class is assigned an elasticity value. When traffic congestion is determined on the air interface during a time frame, the actual rate of data transmission for each user is reduced according to the elasticity of the class to which the user belongs.

14 Claims, 2 Drawing Sheets

CLASS BASED BANDWIDTH SCHEDULING FOR CDMA AIR INTERFACES

FIELD OF THE INVENTION

This invention relates to a method and apparatus for resource scheduling for quality of service (QoS) in telecommunication systems and, more particularly, to a method and apparatus for class based bandwidth scheduling for QoS for CDMA air interfaces.

BACKGROUND OF THE INVENTION

As wireless communication systems evolve, wireless system design has become increasingly demanding in relation to equipment and performance requirements. Future wireless systems, which will be third and fourth generation (3G and 4G) systems as compared to the first generation analog and second generation digital systems currently in use, will be required to provide high quality high transmission rate data services in addition to high quality voice services systems. The major bottleneck to high quality transmission rate date in 3G systems will be the air interface resource.

The major 3G wireless standards have incorporated requirements for supporting quality of service (QoS) into the relevant specifications. For example, the Universal Mobile Telecommunications System (UMTS) developed by the European Technical Standards Institute (ETSI) and The Japanese Association of Radio Industries and Businesses (ARIB) specifies four QoS classes to be supported. These are defined as conversational, streaming, interactive and background classes. The UMTS system is described in the standard document 3GPP TS 23.107, March 2000, published by ETSI. Other major 3G wireless standards, such as the Telecommunications Industry Association/Electronic Industry Association (TIA/EIA) CDMA2000 standard, and the Chinese TD-SCDMA would also require support for QoS.

Existing QoS schemes for CDMA air interfaces focus on satisfying the needs of specific applications. Typically, they provide QoS guarantees to applications such as voice and best effort service to applications such as packet data. In order to implement efficient QoS schemes on 3G CDMA air interfaces, it is necessary to develop techniques for bandwidth provisioning, scheduling, traffic conditioning etc. These mechanisms need to be optimized for supporting mobile multimedia applications. 3G networks will support a variety of services, including some services that will only be defined in the future. A QoS scheme for 3G must be flexible to allow for adding various services and should also provide means for effective negotiation between a service provider and the end user as far as services subscribed for and provided. The QoS scheme should also be practical in that it should have low complexity for implementation and low volume of control signaling.

SUMMARY OF THE INVENTION

The present invention presents a method and apparatus for class based bandwidth scheduling for Quality of Service (QoS) for radio air interfaces. In the method and apparatus, the air interface capacity available for a particular group of users is characterized and then used in a class-based scheduling algorithm to selectively adjust the transmission rates of the users during time frames in which congestion would occur. The method and apparatus may be utilized on either uplink or downlink radio air interfaces.

In an embodiment of the invention, users of an air interface are assigned to at least one of the set of QoS classes "C". The classes may be defined, for example, as conversational class, streaming class, interactive class and background class. Each class "c∈ C" has a total number of users "$N_c$". The classes "c" are also each assigned an elasticity "e(c)" that assigns a certain delay behavior to the class. The larger the value of elasticity, the larger the delay that may be experienced by users subscribed to the class. Each user "j" in a class c has a subscribed rate of data transmission "$r_o(c,j)$" and an actual rate of data transmission "$r_a(c,j,t)$" for a time frame "t". Each user "j" also has an effective bandwidth "R(c,j,t)" for a time frame "t".

According to the embodiment, congestion is determined for each time frame t by determining if the available bandwidth (air interface capacity) is not able to support the effective bandwidth requirements "R(c,j,t)" for all users "j" of all classes "c∈ C" and, when congestion is determined, the actual rate of data transmission for each user is reduced according to the elasticity "e(c)" of the class "c" to which the user belongs.

Figure 1:
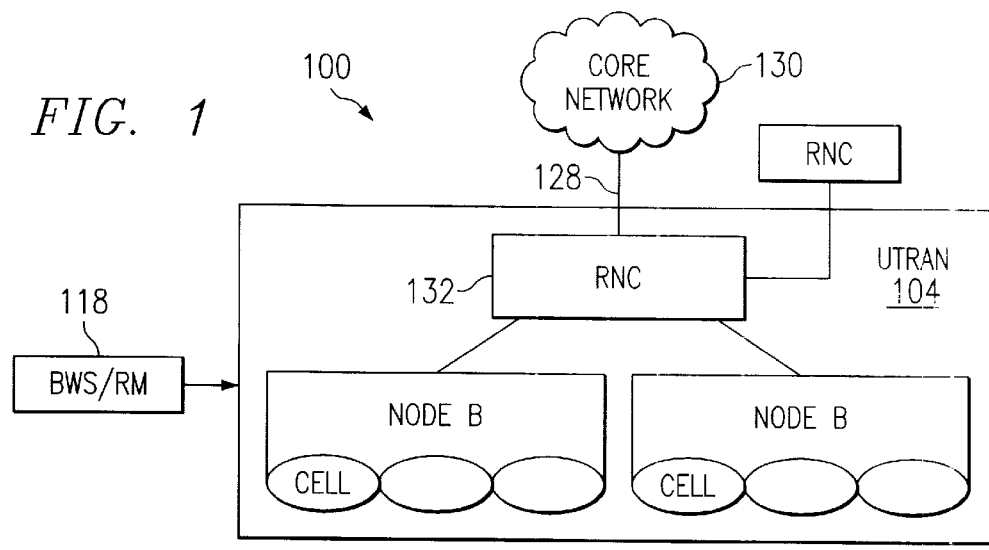
FIG. 1 shows a block diagram of a UMTS network architecture according to an embodiment of the invention.

DETAILED DESCRIPTION OF THE INVENTION:

Referring now to FIG. 1, therein is illustrated a block diagram of portions of a UMTS network according to an embodiment of the invention. Network 100 includes UMTS terrestrial radio access network (UTRAN) 104, mobile terminal (MT) 102 and core network (CN) 130. UTRAN 104 includes at least one node B, which is a cluster of cells providing transmission and reception for radio access of mobile terminals with UTRAN 104 over air interface 116. UNTRAN 104 also includes radio network controller (RNC) 132. RNC 132 is connected to core network (CN) 130. CN 130 may provide access and connection to, the public switched telephone network (PSTN), an internet protocol (IP) network or other communications network for mobile terminals communicating with UTRAN 104 over air interface 116. FIG. 1 illustrates the Bandwidth Scheduler Resource Manager (BWS/RM) function 118 which may be implemented into UTRAN 104 according to the embodiment of the invention MT 102 includes mobile controller 134. In the embodiment MT 102 is a dual mode GSM/UMTS terminal according to the 3GPP specification and also includes a subscriber identity module (SIM) 136 for GSM use, and a UMTS SIM (USIM) 138 for UMTS use. According to the embodiment, a bandwidth scheduler/resource manager (BWS/RM) function 114 is also implemented in MT 114.

In the embodiment, the apparatus and method of the invention is implemented in the system of FIG. 1 to control the bandwidth scheduling of the CDMA air interface 116 for quality of service (QoS). The functions of the embodiment are performed in BWS/RM 118 and BWS/RM 114, which control RNC 132 and controller 134, respectively, to schedule the bandwidth according to the embodiment of the invention. In the embodiment, BWS/RM 118 performs master functions and BWS/114 performs slave functions under control of BWS/RM 118.

Figure 2:
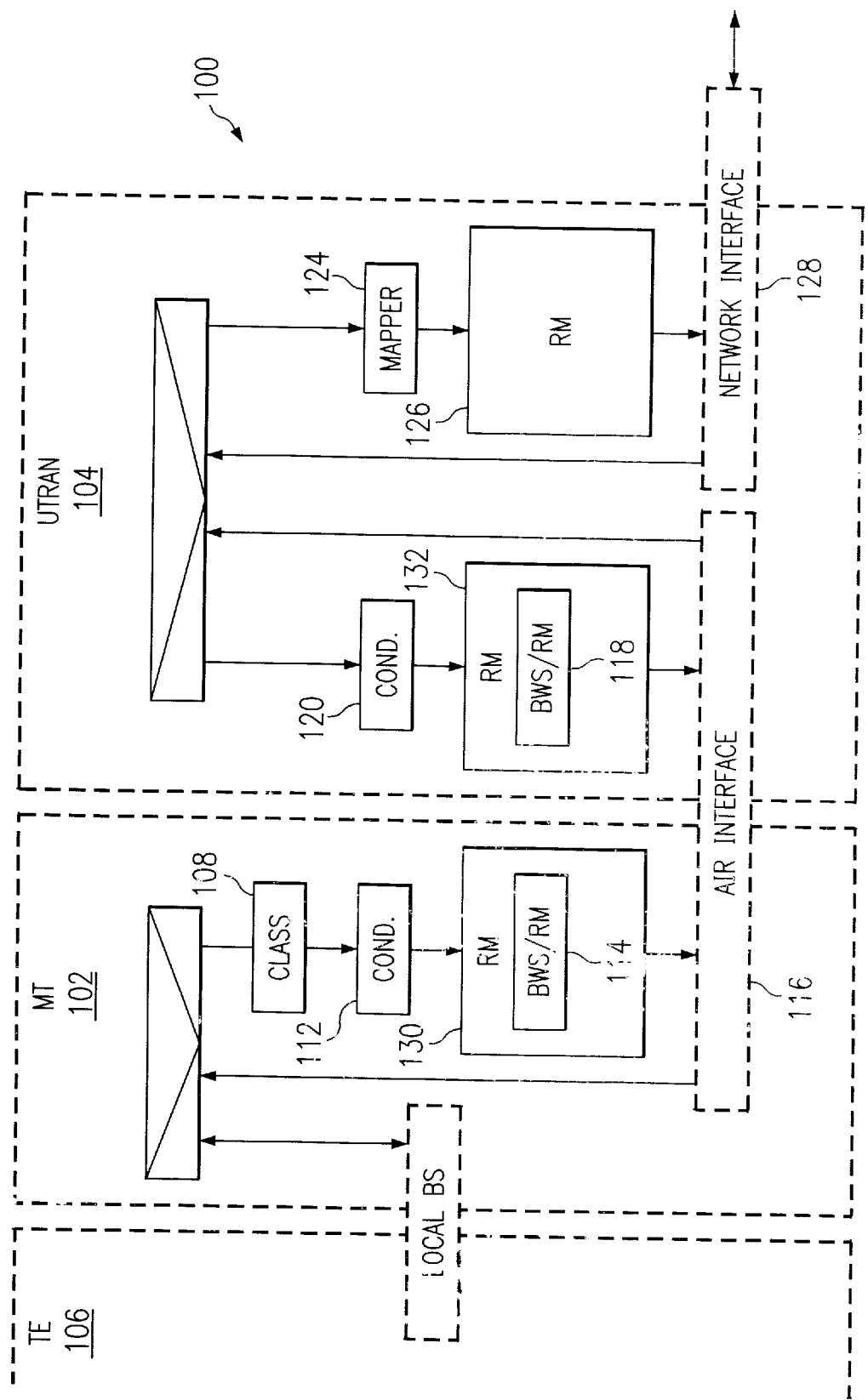
FIG. 2 shows a block diagram of QoS management functions of a network according to an embodiment of the invention.

Referring now to FIG. 2, therein is a block diagram of QoS management functions of the network of FIG. 1 according to an embodiment of the invention. FIG. 2 shows uplink and downlink quality of service functions. The uplink QoS functions include a classification function (class) 108, a Mapping function (map) 110, a traffic conditioner (cond) 112 and resource manager (RM) 130 including bandwidth scheduler/resource manager (BWS/RM) 118. The downlink QoS functions include map function 122, cond function 120 and RM 132 including BWS/RM 118. Class 108 derives the appropriate QoS requirement from the data unit header or from traffic characteristics of the data. The cond 112 and 120 functions provide conformance between a negotiated QoS for a service and the data unit traffic. Traffic conditioning is performed by policing or traffic shaping. The policing function compares the data unit traffic with the relevant service level agreement. Data units not matching the relevant attributes will be dropped or marked as not matching, for preferential dropping in case of congestion. The traffic shaper forms the data unit traffic according to the subscribed service level agreement. After cond 112 and 120 functions are completed the data units are offered to BWS/RM 114 in MT 102 and BWS/RM 118 in UTRAN 104. BWS/RM transmits them on air interface in accordance with the capacity allocated by the bandwidth schedule scheme described in accordance with the embodiment.

In the embodiment of the invention, mobile terminals, including MT 102, are assigned to QoS classes on a terminal, or a service basis, according to the UMTS QoS requirements. In the embodiment, the radio resource required for each user is characterized in terms of its effective bandwidth, which is a function of users transmission rate and its Signal to Interference Ratio (SIR) requirement. Adaptive power control is used to dynamically adjust the transmit-power of each user-terminal such that the actual SIR at the base station for that user is equal to its required SIR. Such a power control scheme is well-developed technology and can be implemented according to 3GPP specifications. The receiver at the base station can be a conventional single antenna matched-filter receiver, or advanced receivers such as multi-user receiver and smart-antenna array receiver. The exact relation between the transmission rate and the required SIR of the user, and its effective bandwidth depends on the receiver that is used in the base station. For example, in the embodiment using a conventional single antenna matched-filter receiver, the effective bandwidth is given by the product of transmission rate and SIR requirement. The capacity of air interface is then governed by the following inequality: Sum of effective bandwidths of all user $\leq \beta(t) \cdot W \cdot M$. Here, W is the total bandwidth of the air interface, M is the number of antennas used at the base station receiver and $\beta(t)$ is air interface bandwidth-utilization during a time frame t.

Figure 3:
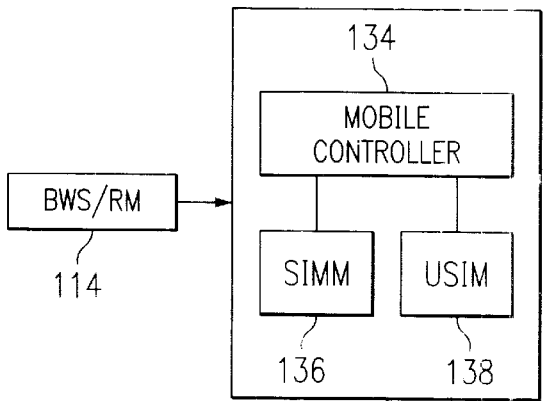
FIG. 3 is a flow chart showing process steps according to an embodiment of the invention.
Figure 3:
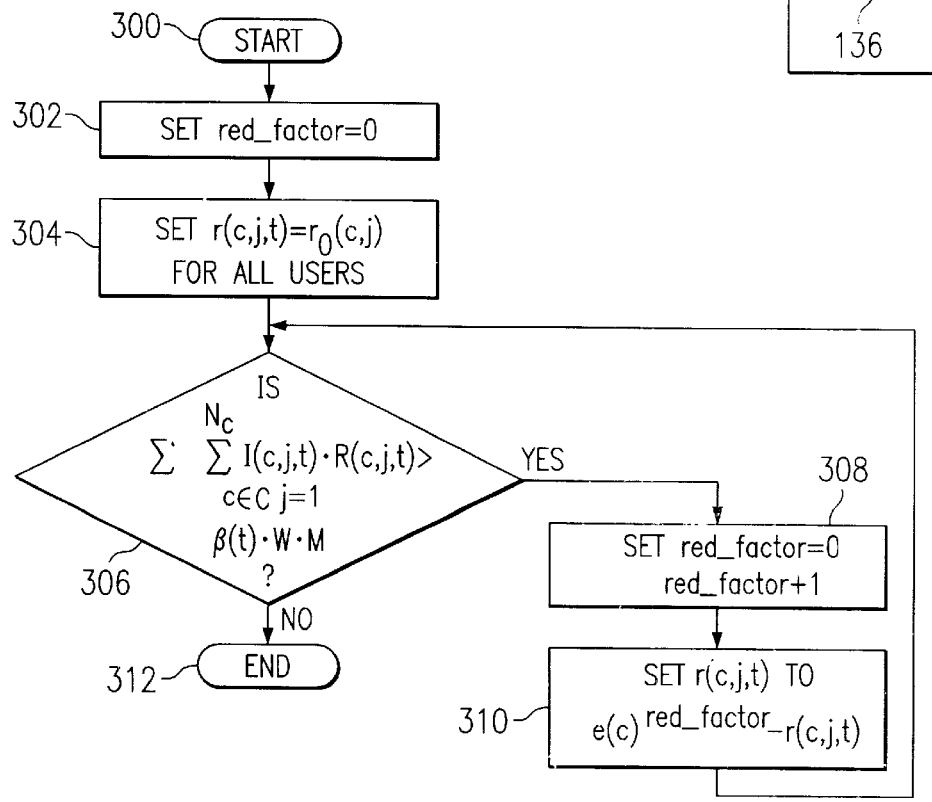

Referring now to FIG. 3, therein is a flow chart showing process steps performed in BWS/RM 114 and BWS/RM 118 according to the embodiment of the invention. The process of FIG. 3 is repeated for every time frame t during which data is to be transmitted on air interface 116. FIG. 3 illustrates an uplink (MT to UTRAN) embodiment. One skilled in the art will realize that the method and apparatus could also be applied to the downlink (UTRAN to MT) in a telecommunication system with appropriate modifications to the algorithms.

The following notation is useful for the description of the algorithm used in the embodiment of FIG. 3:

C: Total number of QoS classes. Note that each class can be assigned a characteristic behavior in terms of throughput and delay, by virtue of the proposed bandwidth-scheduling scheme. It is up to the service provider to choose appropriate number of classes and their behaviors. For example, in the UMTS embodiment of FIG. 3, there are 4 classes to support UMTS QoS classes, namely conversational class, streaming class, interactive class and background class. The bandwidth-scheduling algorithm proposed in this invention provides a machinery to create such classes on the air interface.

$N_c$: Total number of users registered with class $c \in C$.

$r_o(c,j)$: Subscribed rate of data transmission of user j in class c. Note that the assignment of data rate to user can be policy-based, or can be negotiated by signaling protocols such as VoIP signaling or data rate can be configured with user applications.

r(c,j,t): Actual rate of data transmission of user j in class c, in time frame t. Note that in a given time frame t, the actual transmission rate of a user may be different from the subscribed rate, due to the control exercised by the bandwidth-scheduling algorithm. The transmission rate is changed by changing the spreading factor in a variable-spreading multirate system. The transmission data rate is given by:

$$r(c,j,t)=W/S(c,j,t) \qquad (1)$$

where

S(c,j,t) is the spreading factor of user j in class c, in time frame t. Dynamic spreading-gain control is well developed technology and it can be implemented using 3GPP specifications.

R(c,j,t): Effective bandwidth of user j in class c, in time frame t. Recall that for the case of conventional single antenna matched-filter receiver, the effective bandwidth is given by the following equation:

$$R(c,j,t)=r(c,j,t) \cdot SIR(c,j,t) \qquad (2)$$

where

SIR(c,j,t) is the SIR requirement of user j in class c in time frame t. The SIR requirement depends on the target frame error rate, channel condition, modulation, error correction coding, etc. It is adjusted by outer loop power control and can be a time-varying parameter.

e(c): "Elasticity" of class c. This is the parameter used to assign a certain delay behavior to the class. Bigger the value of elasticity, larger is the delay experienced by the users subscribed to the class. This parameter is used for performing bandwidth adjustments in times of congestion on the air interface. In the embodiment of the invention, the elasticities of the classes may be chosen so they can be expressed as reciprocals of multiples of 2, such as 1, ½, ¼, and ⅛. This is advantageous because the users in different classes reduce their transmission rates by fractions equal to the power of elasticities of their classes. The reduction of transmission rate is achieved via a corresponding increase in spreading factor. Since UMTS has a spreading gain, which is a multiple of 2, this embodiment is practical in terms of UMTS.

I(c,j,t): Indicator function for the data availability with user j in class c, in time frame t. In any time frame, this indicator function is equal to 1 if that user has data to transmit in that time frame, otherwise it is equal to zero.

The process of FIG. 3 begins at step 300. At step 302 a variable red_factor is set to 0. Next, at step 304, for each user j of all classes c, the actual rate of transmission r(c,j,t) is set to the subscribed rate of transmission, $r_o(c,j)$.

At step 308, the process begins a congestion determination for time frame t. The congestion determination of the embodiment is performed according to the following equation:

$$\left( \sum_{c \in C} \sum_{j=1}^{N_c} I(c, j, t) \cdot R(c, j, t) > \beta(t) \cdot W \cdot M \right) \quad (3)$$

The congestion determination is performed by determining if the total effective bandwidth R(c,j,t) for all users in all classes having data to transmit in time frame t, is greater than the available bandwidth.

If, at step 308, it is determined that congestion does not occur for time frame t then the process moves to step 312 and ends for time frame t.

If however, at step 308, it is determined that congestion occurs for time frame t then the process moves to step 308. At step 308 red_factor is set to the current value of red_factor+1. Next, at step 310, the transmissions rate for each user is adjusted. The transmission rates are adjusted according to the embodiment by reducing the transmission rate of each user for each class in time frame t according to the elasticity of the class c, by setting r(c,j,t) to $e(c)^{red\_factor}r(c,j,t)$.

The process will return to step 308 to perform a congestion determination again to determine if congestion still exists after the transmission rates have been adjusted. The process will continue through steps 306, 308 and 310 until the congestion determination determines that no congestion exists and the process ends at step 312.

The method and apparatus of the invention has application to any CDMA air interface providing QoS for multiple users. Thus, although the method and apparatus of the present invention has been illustrated and described with regard to presently preferred embodiments thereof, it will be understood that numerous modifications and substitutions may be made to the embodiments described, and that numerous other embodiments of the invention may be implemented without departing from the spirit and scope of the invention as defined in the following claims.

What is claimed is:

1. A method of bandwidth scheduling for a CDMA air interface wherein a plurality of users transmitting on the air interface are each assigned to at least one of a plurality of Quality of Service (QoS) classes, said method comprising the steps of:
   determining whether or not congestion exists on the air interface during a time frame; and
   in response to a determination that congestion exists:
      adjusting the transmission rate of a selected at least one of the plurality of users according to an elasticity value assigned to the at least one of the plurality of QoS classes assigned to said selected at least one of the plurality of users.

2. The method of claim 1, further comprising the step of assigning an elasticity value to each of the plurality of Quality of Service (QoS) classes.

3. The method of claim 2, wherein said elasticity values of each of a plurality of QoS classes are expressible as multiples of 2, and wherein said step of adjusting the transmission rate comprises reducing the transmission rate by increasing the spreading factor of transmissions by a selected user by the reciprocal of the elasticity value of the QoS class assigned to said selected user.

4. The method of claim 1, wherein said step of determining whether or not congestion exists comprises determining whether or not the total effective bandwidth for all of the plurality of users having data to transmit in said time frame is greater than the available bandwidth.

5. The method of claim 4, wherein said total effective bandwidth for all of the plurality of users having data to transmit is calculated by multiplying the actual rate of data transmission for time frame t by the Signal to Interference Ratio (SIR) for each of the plurality of users having data to transmit in said time frame and summing the results of the multiplications of all of the plurality of users having data to transmit in said time frame.

6. The method of claim 1, wherein said steps of determining and adjusting are successively repeated, for each repetition reducing the transmission rate of a selected at least one of the plurality of users by an incremental increase in an elasticity value assigned to the at least one of the plurality of QoS classes assigned to said selected at least one of the plurality of users.

7. A method of bandwidth scheduling for a CDMA air interface, wherein a plurality of users transmit on said CDMA air interface said method comprising the steps of:
   assigning an elasticity value to each of a plurality of Quality of Service (QoS) classes;
   assigning each of the plurality of users to at least one of a plurality of QoS classes;
   determining whether or not congestion exists on the air interface during a time frame; and
   in response to a determination that congestion exists:
      adjusting the transmission rate of at least one of the plurality of users, according to said elasticity value assigned to said at least one of a plurality of QoS classes assigned to each at least one of the plurality of users.

8. The method of claim 7, wherein said step of determining whether or not congestion exists comprises determining whether or not the total effective bandwidth for all of the plurality of users having data to transmit in said time frame is greater than the available bandwidth.

9. The method of claim 8, wherein said total effective bandwidth for all of the plurality of users having data to transmit is calculated by multiplying the actual rate of data transmission for time frame t by the Signal to Interference Ratio (SIR) for each of the plurality of users having data to transmit in said time frame and summing the results of the multiplications of all of the plurality of users having data to transmit in said time frame.

10. An apparatus for scheduling bandwidth for a CDMA air interface wherein a plurality of users transmitting on the air interface are each assigned to at least one of a plurality of Quality of Service (QoS) class, said apparatus comprising:
   a bandwidth scheduler, said bandwidth scheduler for determining whether or not congestion exists on the air interface during a time frame and in response to a determination that congestion exists, adjusting the transmission rate of a selected at least one of the plurality of users according to an elasticity value assigned to the at least one of the plurality of QoS classes assigned to said selected at least one of the plurality of users.

11. The apparatus of claim 10, wherein said bandwidth scheduler further assigns an elasticity value to each of the plurality of QoS classes.

12. The apparatus of claim 11, wherein said elasticity values of each of a plurality of QoS classes are expressible as multiples of 2, and wherein said adjusting the transmission rate comprises reducing the transmission rate by increasing the spreading factor of transmissions by a selected user by the reciprocal of the elasticity value of the QoS class assigned to said selected user.

13. The apparatus of claim 10, wherein said bandwidth schedules determine whether or not congestion exists by determining whether or not the total effective bandwidth for all of the plurality of users having data to transmit in said time frame is greater than the available bandwidth.

14. The apparatus of claim 13, wherein said bandwidth scheduler calculates said total bandwidth for all of the plurality of users having data to transmit by multiplying the actual rate of data transmission for time frame t by the Signal to Interference Ratio (SIR) for each of the plurality of users having data to transmit in said time frame and summing the results of the multiplications of all of the plurality of users having data to transmit in said time frame.

* * * * *